United States Patent
Zhang et al.

(10) Patent No.: US 11,221,921 B2
(45) Date of Patent: Jan. 11, 2022

(54) METHOD, ELECTRONIC DEVICE AND COMPUTER READABLE STORAGE MEDIUM FOR DATA BACKUP AND RECOVERY

(71) Applicant: EMC IP Holding Company LLC, Hopkinton, MA (US)

(72) Inventors: Jimmy Zhang, Chengdu (CN); Hong Deng, Sichuan (CN); Sammi Hongying Wang, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 68 days.

(21) Appl. No.: 16/285,124

(22) Filed: Feb. 25, 2019

(65) Prior Publication Data

US 2020/0117543 A1    Apr. 16, 2020

(30) Foreign Application Priority Data

Oct. 12, 2018  (CN) .......................... 201811192218.6

(51) Int. Cl.
*G06F 11/14*     (2006.01)
*G06F 3/06*      (2006.01)
(Continued)

(52) U.S. Cl.
CPC .......... *G06F 11/1448* (2013.01); *G06F 3/067* (2013.01); *G06F 3/0619* (2013.01);
(Continued)

(58) Field of Classification Search
CPC ............... G06F 11/1448; G06F 16/907; G06F 16/1827; G06F 3/0619; G06F 3/0643; G06F 3/067
See application file for complete search history.

(56) References Cited

U.S. PATENT DOCUMENTS

| 2007/0185852 A1* | 8/2007 | Erofeev | ................. G06F 16/166 |
| 2010/0095289 A1* | 4/2010 | Nguyen  | .................. G06F 8/658 717/169 |

(Continued)

*Primary Examiner* — Nanci N Wong
(74) *Attorney, Agent, or Firm* — Womble Bond Dickinson (US) LLP

(57) ABSTRACT

Embodiments of the present disclosure relate to a method, electronic device and computer readable storage medium for data backup and recovery. The data backup method comprises: receiving data to be backed up and metadata describing the data to be backed up, the data to be backed up comprising a file and a directory, the metadata comprising file data associated with the file and directory data associated with the directory; generating path data associated with both the file and the directory based on the file data and the directory data; and storing the file data, the directory data, and the path data in association with the data to be backed up. Correspondingly, the data recovery method comprises: receiving information about data to be recovered; in response to the information being related to a path, obtaining path data associated with both a file and a directory, the path data being generated based on file data associated with the file and directory data associated with the directory; determining, based on the path data, metadata describing the data to be recovered; obtaining, based on the metadata, the data to be recovered; and transmitting the data to be recovered to implement data recovery. In this way, rapid recovery of the backup data is achieved.

20 Claims, 10 Drawing Sheets

(51) Int. Cl.
*G06F 16/907* (2019.01)
*G06F 16/182* (2019.01)

(52) U.S. Cl.
CPC ........ *G06F 3/0643* (2013.01); *G06F 16/1827* (2019.01); *G06F 16/907* (2019.01)

(56) References Cited

U.S. PATENT DOCUMENTS

| | | | |
|---|---|---|---|
| 2015/0124656 A1* | 5/2015 | Yamada | H04L 49/90 370/256 |
| 2016/0210302 A1* | 7/2016 | Xia | G06F 3/1285 |
| 2017/0078151 A1* | 3/2017 | Usuda | G06F 3/0658 |
| 2018/0121454 A1* | 5/2018 | Kushwah | G06F 16/13 |
| 2019/0026301 A1* | 1/2019 | Wang | G06F 16/152 |
| 2019/0179714 A1* | 6/2019 | Karthikeyan | G06F 3/0619 |

* cited by examiner

METHOD, ELECTRONIC DEVICE AND COMPUTER READABLE STORAGE MEDIUM FOR DATA BACKUP AND RECOVERY

CROSS-REFERENCE TO RELATED APPLICATION

This patent application claims priority, under 35 U.S.C. § 119, of Chinese Patent Application No. 201811192218.6, filed Oct. 12, 2018, entitled "METHOD, ELECTRONIC DEVICE AND COMPUTER READABLE STORAGE MEDIUM FOR DATA BACKUP AND RECOVERY."

FIELD

The present disclosure relate to the field of computers, and more specifically to a method, electronic device and computer readable storage medium for data backup and recovery.

BACKGROUND

Network Attached Storage (NAS) devices are usually placed in a local area network as a node of the network to allow users to directly access data over the network. In this arrangement, the NAS devices may centrally manage and process all data on the network, reducing the load on applications or enterprise servers and reducing costs.

After receiving a large amount of data on the network, the NAS device needs to perform backup processing for the received data in order to ensure data security. Usually, when data is backed up, data is stored in association with metadata describing the data in a memory for data backup (hereinafter also referred to as a backup memory). When the backup data is to be recovered, the corresponding backup data is obtained from the backup memory by looking up the metadata. Usually metadata is organized in the form of inode values. In this case, when data is acquired by the inode value, data recovery may be efficiently performed. However, when data is acquired through a path location, in the case where the backup data contains a large number of directories and files, it takes a long time to determine the metadata of the directories and files related to the path. Therefore, it takes a long time to recover the backup data with a low efficiency.

SUMMARY

Embodiments of the present disclosure provide an improved solution for data backup and recovery.

According to a first aspect of the present disclosure, there is provided a data backup method. The method includes: receiving data to be backed up and metadata describing the data to be backed up, the data to be backed up comprising a file and a directory, the metadata comprising file data associated with the file and directory data associated with the directory; generating path data associated with both the file and the directory based on the file data and the directory data; and storing the file data, the directory data, and the path data in association with the data to be backed up.

According to a second aspect of the present disclosure, there is provided a data recovery method. The method includes: receiving information about data to be recovered; in response to the information being related to a path, obtaining path data associated with both a file and a directory, the path data being generated based on file data associated with the file and the directory data associated with the directory; determining, based on the path data, metadata describing the data to be recovered; obtaining, based on the metadata, the data to be recovered; and transmitting the data to be recovered to implement data recovery.

According to a third aspect of the present disclosure, there is provided an electronic device. The electronic device includes: at least one processor; and a memory coupled to the at least one processor and having instructions stored thereon, the instructions, when executed by the at least one processor, causing the device to perform acts of: receiving data to be backed up and metadata describing the data to be backed up, the data to be backed up comprising a file and a directory, the metadata comprising file data associated with the file and directory data associated with the directory; generating path data associated with both the file and the directory based on the file data and the directory data; and storing the file data, the directory data, and the path data in association with the data to be backed up.

According to a fourth aspect of the present disclosure, there is provided an electronic device. The electronic device includes: at least one processor; and a memory coupled to the at least one processor and having instructions stored thereon, the instructions, when executed by the at least one processor, causing the device to perform acts of: receiving information about data to be recovered; in response to the information being related to a path, obtaining path data associated with both a file and a directory, the path data being generated based on file data associated with the file and directory data associated with the directory; determining, based on the path data, metadata describing the data to be recovered; obtaining, based on the metadata, the data to be recovered; and transmitting the data to be recovered to implement data recovery.

According to a fifth aspect of the present disclosure, there is provided a computer readable storage medium. The computer readable storage medium comprises computer readable program instructions stored thereon which, when executed by a processing unit, cause the processing unit to implement the method of the first aspect of the present disclosure.

According to a sixth aspect of the present disclosure, there is provided a computer readable storage medium. The computer readable storage medium comprises computer readable program instructions stored thereon which, when executed by a processing unit, cause the processing unit to implement the method of the second aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other features, advantages and aspects of example embodiments of the present disclosure will become more apparent. In the drawings, identical or similar reference numbers represent the same or similar elements, in which.

Throughout the drawings, the same or similar reference symbols refer to the same or similar elements.

DETAILED DESCRIPTION

Figure 1:
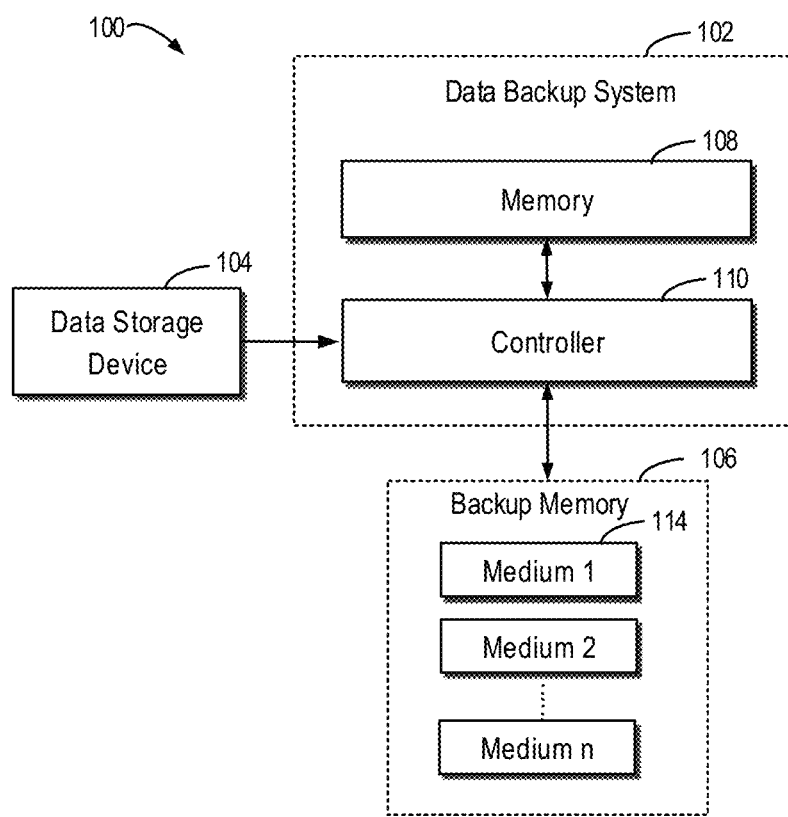
FIG. 1 illustrates a diagram of architecture a storage system according to an embodiment of the present disclosure.

Embodiments of the present disclosure will be described with reference to the drawings in detail. Though some embodiments of the present disclosure are shown in the drawings, it should be appreciated that the present disclosure may be implemented in various manners and should not be interpreted as limited to the implementations described herein. Conversely, these implementations are provided for thorough and complete understanding of the present disclosure. It is to be understood that the drawings and implementations are only for the purpose of example, rather than to limit the scope of protection of the present disclosure.

As used herein, the term "includes" and its variants are to be read as open terms that mean "includes, but is not limited to." Unless otherwise specified particularly, the term "or" represents "and/or". The term "based on" is to be read as "based at least in part on." The terms "one implementation" and "an implementation" are to be read as "at least one implementation." The term "another implementation" is to be read as "at least one other implementation." The terms "first," "second," and the like may refer to different or same objects. Other definitions, either explicit or implicit, may be included below.

FIG. 1 illustrates a diagram of architecture a storage system 100 according to an embodiment of the present disclosure. The storage system 100 may include a data storage device 104 that needs to back up stored data. In one example, the data storage device 104 may be a NAS device. The NAS device 104 may be connected to the network and receive a large amount of data from the network. Alternatively or additionally, the data storage device 104 may also be a direct attached storage (DAS) device, a storage network (SAN) device, or the like. It should be understood that the data storage device 104 may also be other suitable data storage devices, and embodiments of the present disclosure do not impose any limitation thereon. For convenience of description, an embodiment of the present disclosure will be described below by taking a NAS device as an example.

The storage system 100 may further include a data backup system 102 and a backup memory 106. In this example, the data backup system 102 is used to back up the data to be stored. To ensure the security of the data in the data storage device 104, the data backup system 102 backs up the data on the data storage device 104 into the backup memory 106. The data backup system 102 may include a memory 108 and a controller 110.

The backup memory 106 may be a storage device for storing large-capacity data. The storage device may include various volatile and/or non-volatile data storage media 114. Examples of the storage medium 114 may include, but are not limited to, a magnetic disk, an optical disk, a hard disk, a solid state drive (SSD), and a cache.

In this example, the data storage device 110 of FIG. 1 is a NAS device that transmits a data stream to the data backup system 112 via a Network Data Management Protocol (NDMP) (described in detail later in FIG. 7), the data stream including data to be backed up and metadata describing the data to be backed up. The data to be backed up includes files and directories (also known as directory files). The metadata may include one or more of types, names, sizes, paths, inode values and the like of files and directories stored in the NAS device. According to an embodiment of the present disclosure, the inode value may be indication information of a storage location of metadata of files and directories stored in the NAS device. In one example, the indication information may be address information. In another example, the indication information may be a value assigned to purposely identify the nodes in the NAS device. For example, the inode information is stored in an array-like manner, and the node value is the position in the array.

As mentioned above, when backing up data, the NAS device stores the data to be backed up in association with the metadata describing the data to be backed up in the backup memory. When the backup data is to be recovered, the corresponding backup data is obtained from the backup memory by looking up the corresponding metadata. Usually metadata is organized by inode values. Therefore, when data is obtained by the inode value, data recovery may be efficiently completed. However, when data is obtained through a path location, in the case where the backup data contains a large number of directories and files, it takes a long time to determine the metadata of the directories and files related to the path. Therefore, it takes a long time to recover backup data with a low efficiency.

In view of this, a basic concept of an embodiment of the present disclosure is to provide a solution capable of quickly recovering backup data. In this solution, in addition to organizing metadata by inode values, metadata is organized in the form of a path, thereby achieving rapid recovery of backup data. The concept will be described in detail below with reference to FIGS. 2 to 4.

Figure 2:
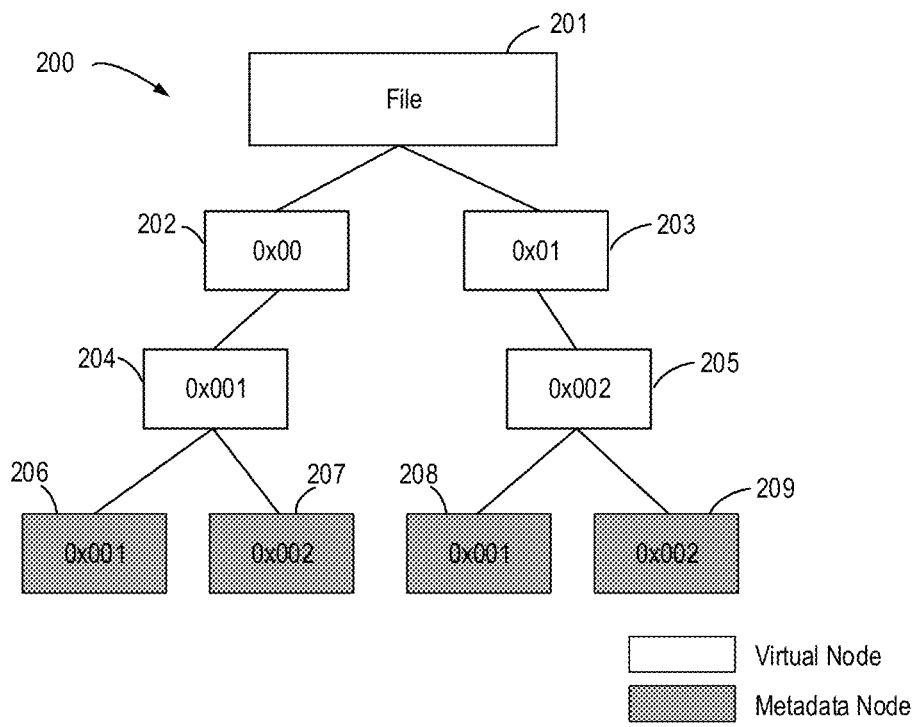
FIG. 2 illustrates a schematic diagram of mapping of file data according to an embodiment of the present disclosure.
Figure 3:
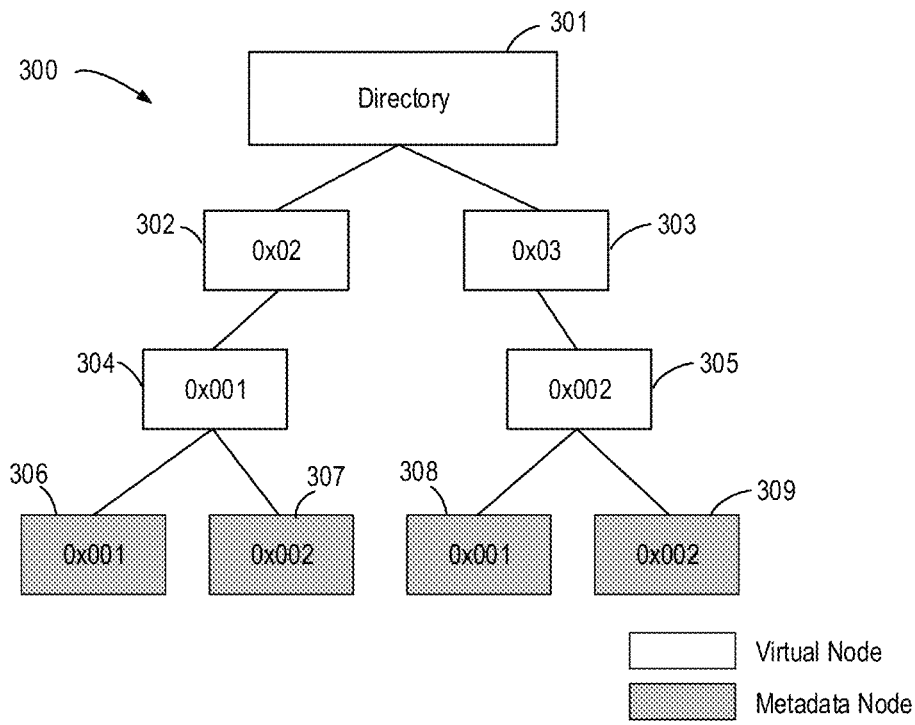
FIG. 3 illustrates a schematic diagram of mapping of directory data according to an embodiment of the present disclosure.

In an embodiment of the present disclosure, metadata associated with a file is referred to as file data, and metadata associated with the directory is referred to as directory data. FIG. 2 shows a schematic diagram (file tree) 200 of mapping of file data in accordance with an embodiment of the present disclosure. FIG. 3 shows a schematic diagram (directory tree) 300 of mapping of directory data in accordance with an embodiment of the present disclosure. FIGS. 2 and 3 show the mapping of file data and directory data in the form of a tree. In an alternative embodiment, an array may also be employed. It should be understood that in embodiments of the present disclosure, the file data and directory data may be presented or stored in any suitable form of data structure known in the art or developed in the future.

According to some embodiments of the present disclosure, when the data backup system 102 receives data to be backed up from the NAS device, the type indication information and the inode value of the data may be obtained therefrom. The data obtained by the type indication information is mapped to the corresponding tree as the first address. For example, when the type is a file, the type indication information is mapped to a storage address of a root node 201 of the file tree as shown in FIG. 2. For example, when the type is a directory, the type indication information is mapped to a storage address of a root node 301 of the directory tree as shown in FIG. 3.

After the data-based type indication information is mapped to the root node of the tree, the data-based inode value is mapped to a leaf node of the tree, that is to say, after finding the address of the root node of the tree, finding the address of the leaf node of the tree based on the inode value. In one example, the inode may be represented by 8-bit hexadecimal data. Multiple layers of a tree are represented by dividing an 8-bit number into multiple parts. For example, the 8-bit number is divided in the form of bits 2, 3, and 3 to form three layers of the tree. For example, the type indication information of the data is a file and the inode value of the data is "0X00001001". Referring to FIG. 2, the corresponding file tree is divided into three layers, and each layer corresponds to 2 bits, 3 bits, and 3 bits of the inode, that is, "0X00", "0X001", "0X001", and thus the leaf node 206 of the file tree is found as shown in FIG. 2. In other examples, the inodes may also be divided in other forms. In another example, the inode value may be a value having any number of bits. This also applies to the directory tree of FIG. 3, and will not be described in detail here.

After the data-based type indication information and the inode value determine an address, that is, a leaf node of the tree (such as 206 to 209 of FIGS. 2 and 306 to 309 of FIG. 3), information about storage locations of the data is stored at the address (also referred to herein as metadata information). In one example, the metadata information may include, but is not limited to, location information, type information, storage unit identification (ID), and offset information of the data in the backup memory 106. Leaf nodes 206 through 209 and 306 through 309 in FIGS. 2 and 3 are also referred to as metadata nodes. Nodes 202 through 205 and 302 through 305 in FIGS. 2 and 3 are referred to as virtual nodes, and they are only used to organize metadata nodes and do not include useful metadata.

In a conventional solution, for example, when the user is browsing the path location "/folder/subfolder 1/file 1", that is, when the backup data needs to be obtained through the path location, the data backup system 102 needs to traverse the directory tree 300 to find the metadata of "folder" and "subfolder 1", and traverse the file tree 200 to find the metadata of "file 1". In this case, the lookup of metadata is quite cumbersome, resulting in slow data recovery.

Figure 4:
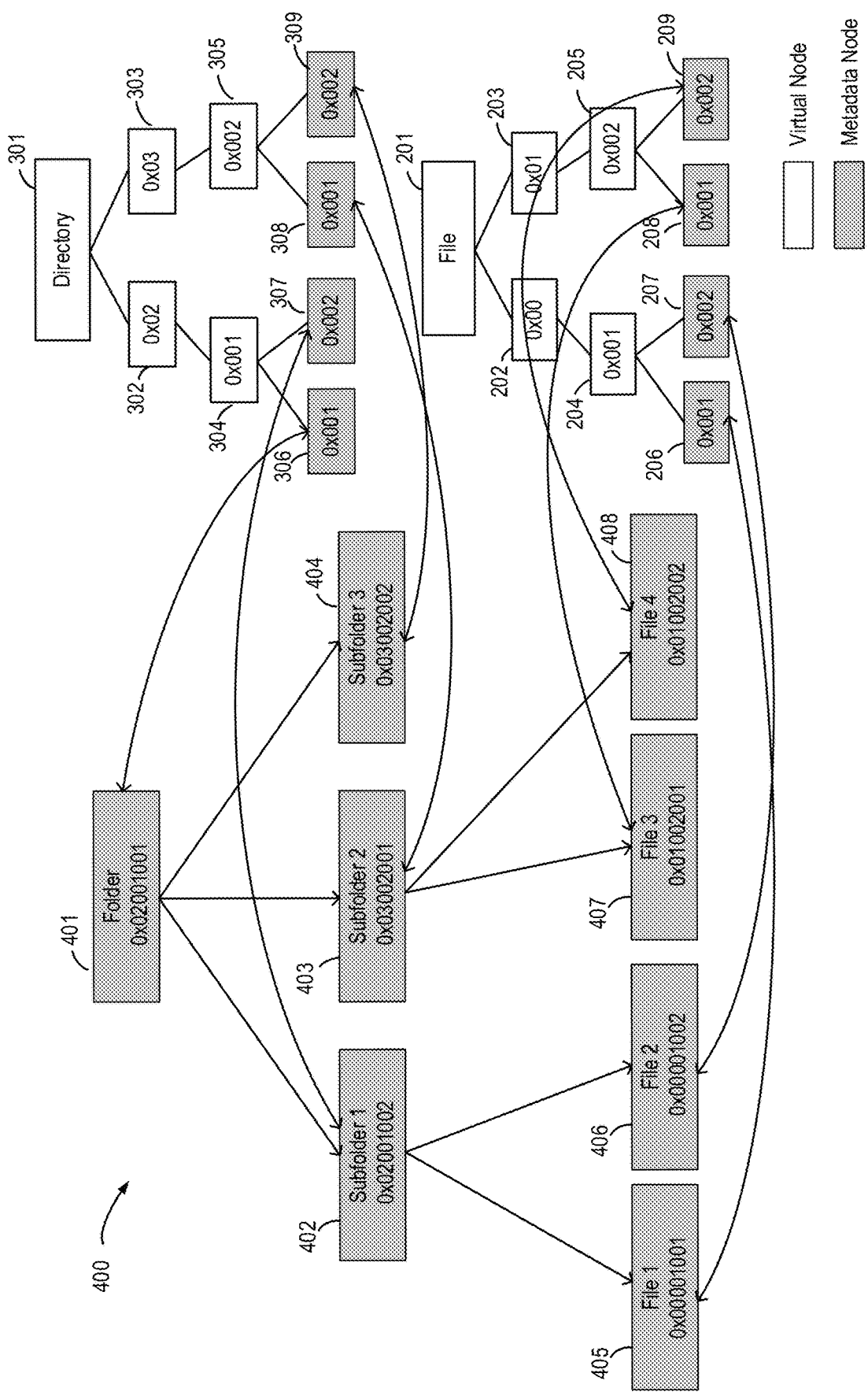
FIG. 4 illustrates a schematic diagram showing a relationship between path data and file data and directory data according to an embodiment of the present disclosure.

Thus, the present inventors have thought that the metadata lookup efficiency may be improved by constructing path data including metadata information of both the directory and the file, thereby improving the data recovery speed. According to an embodiment of the present disclosure, the path data may be generated based on file data and directory data. FIG. 4 shows a schematic diagram (path tree) 400 of the relationship between path data and file data and directory data in accordance with an embodiment of the present disclosure. Similar to FIGS. 2 and 3, the mapping of path data is also shown in FIG. 4 in the form of a tree. In an alternative embodiment, an array may also be employed. It should be understood that in embodiments of the present disclosure, the path data may be presented or stored in any suitable form of data structure known in the art or developed in the future.

As shown in FIG. 4, nodes 401 to 404 of the path tree correspond to leaf nodes 306 to 309 of the directory tree, and nodes 405 to 408 of the path tree correspond to leaf nodes 206 to 209 of the file tree. In the solution of the embodiment of the present disclosure, for example, when the user is browsing the path location "/folder/subfolder 1/file 1", that is, when the backup data needs to be obtained through the path location, the data backup system 102 may find metadata of "folder", "subfolder 1", and "file 1" by only traversing the path tree 400. Therefore, the required metadata may be quickly found to achieve rapid recovery for backup data.

Figure 5:
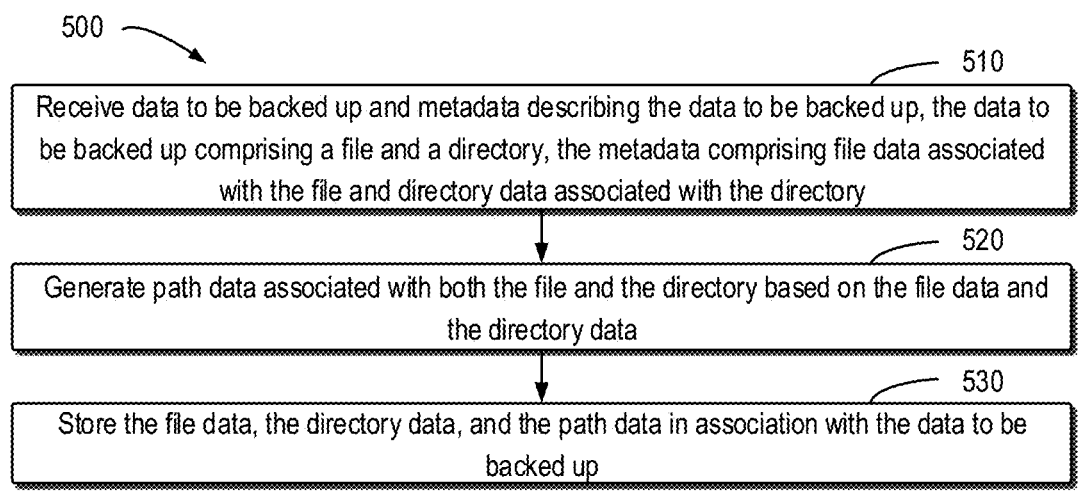
FIG. 5 illustrates a flow chart of a method for data backup according to an embodiment of the present disclosure.

Based on the above concept, embodiments of the present disclosure provide corresponding solutions for file backup and recovery. This will be described in detail below with reference to FIGS. 5 to 11. FIG. 5 illustrates a flow chart of a method 500 for data backup in accordance with an embodiment of the present disclosure. The method 500 may be implemented at, for example, the data backup system 102 of FIG. 1.

Figure 7:
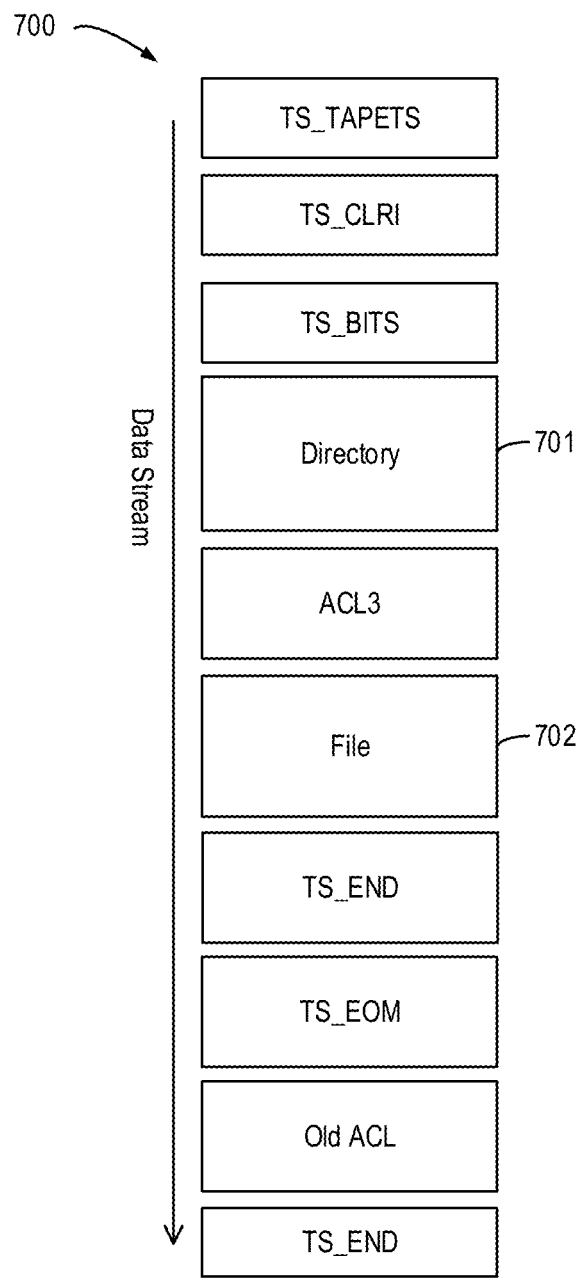
FIG. 7 illustrates a schematic diagram of data stream transmission according to an embodiment of the present disclosure.

At block 510, data to be backed up and metadata describing the data to be backed up are received. After the data storage device 104 obtains the data and saves it in FIG. 1, the data storage device 104 transmits data to the data backup system 102 for data security. In one example, the data storage device 104 transmits data to the data backup system via an NDMP protocol. Correspondingly, the data backup system 102 receives the data. FIG. 7 shows a schematic diagram 700 of data stream transmission in accordance with an embodiment of the present disclosure. In an embodiment of the present disclosure, the data to be backed up includes files and directories, and the metadata includes file data associated with the files and directory data associated with the directories. As shown in FIG. 7, in the data stream of the data to be backed up from the data storage device 104, block 701 represent directories in the data to be backed up and the metadata associated with the directories (i.e., the directory data). Block 702 represents the files in the data to be backed up and the metadata associated with the files (i.e., file data). It should be understood that FIG. 7 is only an example of data stream transmission, and does not constitute any limitation to the embodiments of the present disclosure. Embodiments of the present disclosure are actually applicable to any suitable data stream transmission scenario.

At block 520, path data associated with both the files and the directories is generated based on the file data and the directory data. According to an embodiment of the present disclosure, path information of directories and files may be determined from directory data in 701 and file data in 702, and path data is generated based on the path information. In some embodiments, the path information may include inode values, subdirectory or subfile information, parent directory information and so on of the files and directories. In some embodiments, the path data may be generated based on the inode values and subdirectory and subfile information of the files and directories. In some alternative embodiments, path data may be generated based on inode values and parent directory and subfile information of files and directories. In still other alternative embodiments, path data may be generated based on inode values and subdirectory, subfile and parent directory information of files and directories. It should be understood that the path data associated with both the file and the directory may be generated based on the path information in any suitable manner, and will not be described in detail one by one herein. An exemplary embodiment for generating path data based on the inode values and patent directory and subfile information of the inode value of the files and directories is described below with reference only to FIG. 6.

Figure 6:
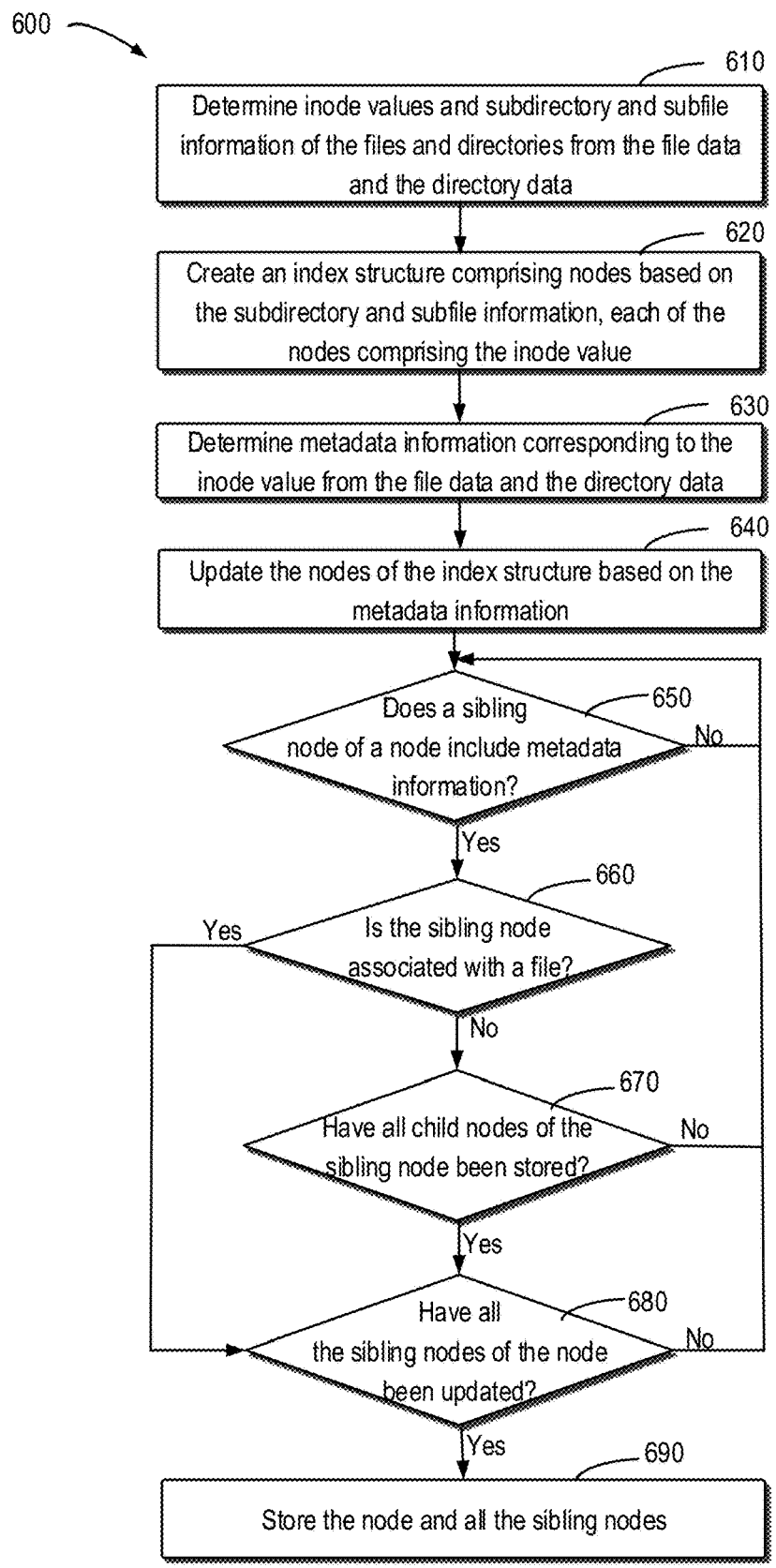
FIG. 6 shows a flow chart of a method for generating path data according to an embodiment of the present disclosure.

FIG. 6 shows a flow chart of a method 600 for generating path data in accordance with an embodiment of the present disclosure. The method 600 may be implemented at, for example, the data backup system 102 of FIG. 1.

At block 610, the inode values and subdirectory and subfile information of the files and directories are determined from the file data and the directory data. According to some embodiments of the present disclosure, for example, as shown in FIG. 7, the inode values and subdirectory and subfile information of the directories are determined from the directory data in 701, and the inode values of the files are determined from the file data in 702.

At block 620, an index structure including nodes is created based on the subdirectory and subfile information, each of the nodes comprising an inode value. According to an embodiment of the present disclosure, the index structure may be a tree. In an alternative embodiment, the index structure may be an array. It should be understood that the index structure may also take any other form known in the art or developed in the future. For the sake of convenience, the tree structure is taken as an example for description below.

Figure 8:
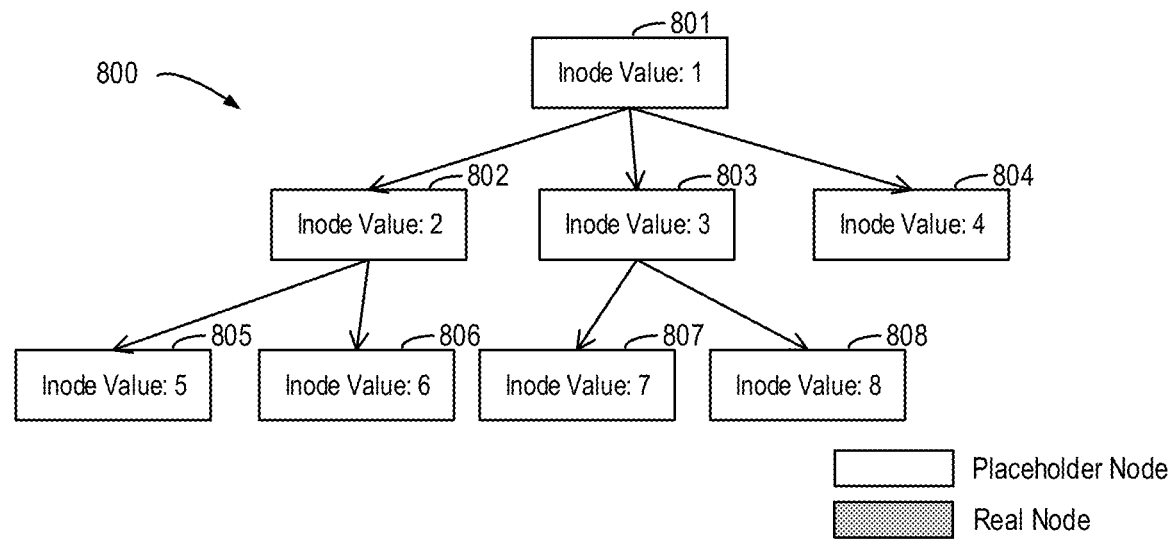
FIG. 8 illustrates a schematic diagram of creating an index structure according to an embodiment of the present disclosure.

FIG. 8 shows a schematic diagram 800 of creating an index structure (tree) in accordance with an embodiment of the present disclosure. According to an embodiment of the present disclosure, the index structure of FIG. 8 may be constructed based on, for example, a Merkle tree. It should be understood that it may also be constructed based on other types of trees, and the embodiments of the present disclosure do not impose any limitation thereon. In the process of generating the index structure, two kinds of nodes, namely, a placeholder node and a real node, are included. The placeholder node only contains the inode value of a file or directory and the inode value of a subfile or subdirectory. The real node contains real metadata of the file or directory. When the index structure is initially created, the index structure includes only the placeholder nodes such as 801 to 808. According to an embodiment of the present disclosure, based on the subfile and subdirectory information determined at block 610, a tree structure reflecting a hierarchical relationship between the file and the directory may be created, as shown in FIG. 8. Each of the nodes 801 to 808 of the tree is a placeholder node which contains the inode value of the corresponding file or directory and the inode value of the subfile or subdirectory. Through the placeholder nodes, it is possible to describe the structure of an inheritance relationship from a path perspective, but the structure does not include specific metadata of each node.

Returning to FIG. 6, at block 630, metadata information corresponding to the inode value is determined from the file data and the directory data. According to an embodiment of the present disclosure, the metadata information includes information of a storage location of the data. In one example, the metadata information may include, but is not limited to, location information, type information, storage unit ID, and offset information of the data in the backup memory. According to an embodiment of the present disclosure, metadata information may be determined from the data stream (FIG. 7) from the data storage device 104.

Figure 9:
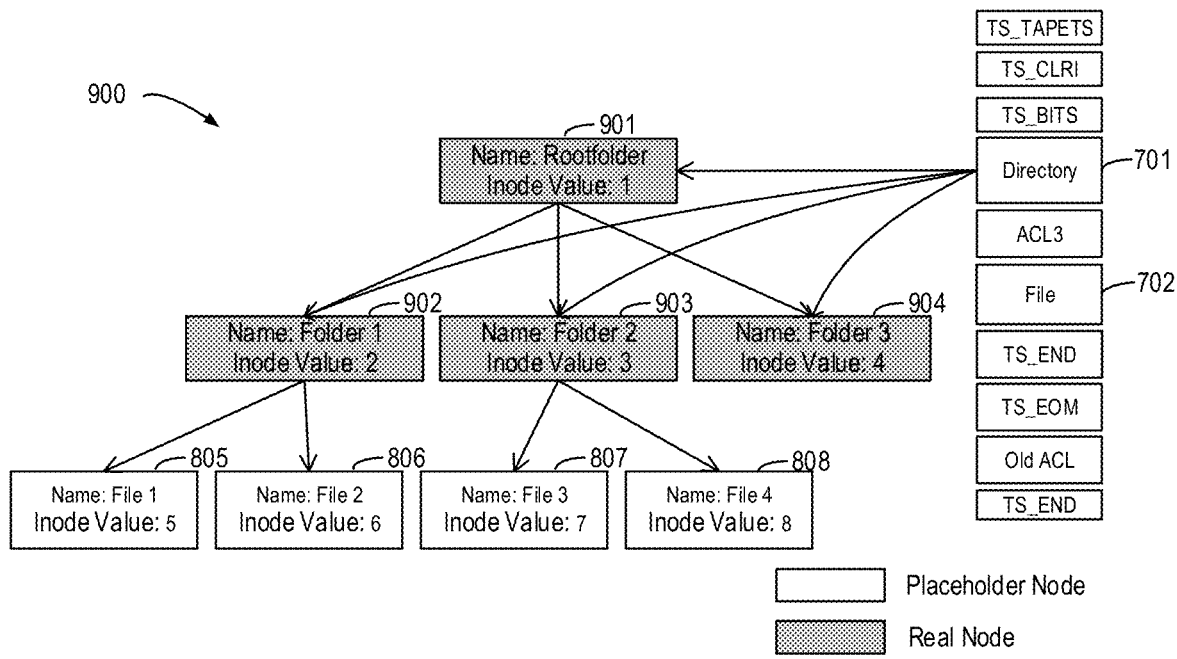
FIG. 9 illustrates a schematic diagram of updating nodes in an index structure in accordance with an embodiment of the present disclosure.

At block 640, the node of the index structure is updated based on the metadata information. This corresponds to the process of replacing a placeholder node with a real node. FIG. 9 shows a schematic diagram 900 of updating nodes in an index structure based on a directory portion 701 in a data stream. As shown in FIG. 9, when the directory portion 701 of the data stream of FIG. 7 is processed, the contents in each directory contain a list of inode values and a list of names of its subfiles or subdirectories, as shown below.

| Inode value 0x0abc (Directory 1) | |
| --- | --- |
| Child name | inode value |
| Subdirectory 1 | acc |
| File 2 | 222 |
| Subdirectory 2 | 357 |
| File 3 | 765 |

These contents are enough to create an index structure with placeholder nodes. At the same time, the directory portion 701 also contains metadata for all directories. Hence, the metadata information may be obtained therefrom to update all placeholder nodes of the directory in the index structure, such as nodes 910-904 in FIG. 9.

Figure 10:
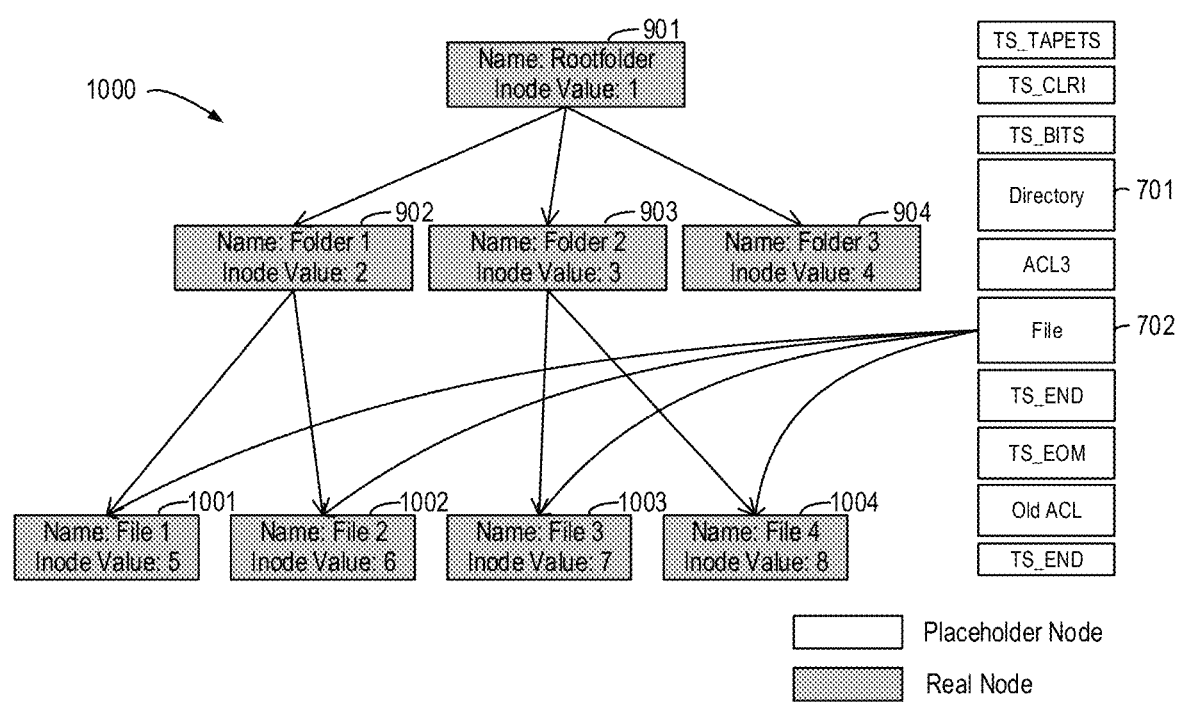
FIG. 10 illustrates a schematic diagram of updating nodes in an index structure in accordance with an embodiment of the present disclosure.

FIG. 10 shows a schematic diagram 1000 of updating nodes in an index structure based on a file portion 702 in a data stream. The file portion 702 contains all files to be backed up. Thus, the metadata information may be obtained therefrom to update all placeholder nodes of files in the index structure, such as nodes 1001-1004 in FIG. 10. So far, an index structure, namely, path data, is generated.

Returning to FIG. 5, at block 530, the file data, the directory data, and the path data are stored in association with the data to be backed up. According to some embodiments of the present disclosure, the file data, the directory data, and the path data may be stored in the memory 108 of the data backup system 102. In some alternative embodiments, the file data, the directory data, and the path data may be stored in a cache of the data backup system 102. In some other alternative embodiments, the file data, the directory data, and the path data may be stored in the backup storage 106 along with the data to be backed up.

According to some embodiments of the present disclosure, the index structure may be backed up after the index structure of the path data is generated. That is, after all placeholder nodes are replaced with real nodes, the index structure is backed up. According to an alternative embodiment of the present disclosure, the index structure may be backed up while being generated. That is, after a portion of placeholder nodes are replaced with real nodes, the replaced nodes are stored. After the replaced nodes are backed up, the nodes may be deleted from the storage space. This may save and optimize the storage space. This is exemplarily described below in conjunction with blocks 650 through 690 of FIG. 6.

After the node of the index structure at block 640 is updated based on the metadata information, according to some embodiments of the present disclosure, it is possible to determine whether all sibling nodes of the node have been updated, and store the node and all the sibling nodes if all the sibling nodes have been updated.

For example, at block 650, it is determined whether a sibling node of a node includes metadata information. If the sibling node does not include metadata information, that is, the sibling node is a placeholder node, the node is not stored. If the sibling node includes metadata information, then the process proceeds to block 660. At block 660, it is determined if the sibling node is associated with a file. That is, it is determined whether the sibling node is a file node. If the sibling node is not associated with a file, the process proceeds to block 670. If the sibling node is associated with the file, the process proceeds to block 680.

At block 670, it is determined whether all child nodes of the sibling node have been stored. If all the child nodes of the sibling node have been stored (the hash field contains a valid value), the process proceeds to block 680. If it is the case that not all the child nodes are stored, the node is not stored. At block 680, it is determined if all the sibling nodes of the node have been updated. If updated, the process proceeds to block 690 to store the node and all its sibling nodes. If not updated, the node is not stored.

In this way, the index structure may be backed up while the index structure is being generated, and the part of the index structure that has been backed up is deleted. This saves the storage space and optimizes storage resource management.

An example embodiment of a data backup method according to an embodiment of the present disclosure has been described so far. According to an embodiment of the present disclosure, it is possible to, upon performing data backup, generate path data associated with both a file and a directory based on metadata associated with the file (file data) and metadata associated with the directory (directory data), and store the path data together with the file data and directory data in association with the data to be backed up, thereby facilitating rapid search for metadata upon data recovery and improving the overall efficiency of the storage system.

Figure 11:
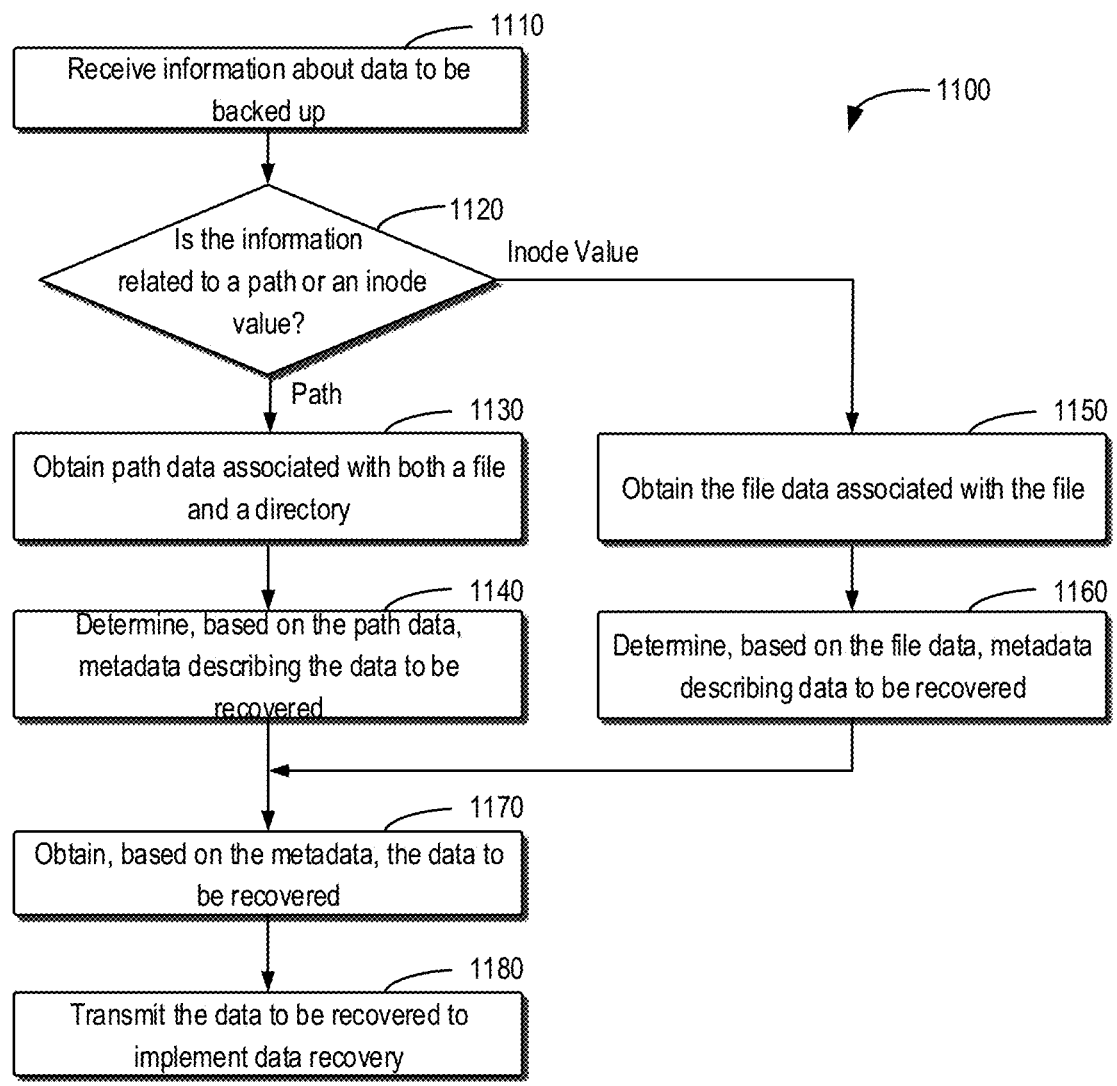
FIG. 11 illustrates a flow chart of a method for data recovery in accordance with an embodiment of the present disclosure.

Correspondingly, embodiments of the present disclosure also provide methods for data recovery. FIG. 11 shows a flow chart of a method 1100 for data recovery in accordance with an embodiment of the present disclosure. The method 1100 may be implemented at, for example, the data backup system 102 of FIG. 1.

As shown in FIG. 11, at block 1110, information about data to be recovered is received. As in FIG. 1, if the data storage device 104 needs to recover part of the data, it is necessary to send a request to the data backup system 102 to restore the backup data. In one example, the request at least includes indication information indicating a storage location of metadata of the data in the data storage device 104, wherein the indication information may be represented in the form of an mode value. In an alternative example, the indication information may be represented in the form of a path location.

At block 1120, it is determined whether the received information is related to the path or to the mode value. If it is determined that the received information is related to the path, the process proceeds to block 1130 to obtain path data associated with both the file and the directory, such as the path data previously generated in connection with FIGS. 5-10. For example, if the received information indicates that metadata of "/folder/subfolder1/file1" is need, it is only necessary to traverse the path data such as a path tree. In another example, if the received information indicates that metadata of "/folder/subfolder 1" is needed, it is also only necessary to traverse the path data such as a path tree.

At block 1140, metadata describing the data to be recovered is determined based on the path data. For example, based on the received information, metadata corresponding to the path in the information is found from the path data. Since the path data contains the inheritance relationship between the file and the directory and the corresponding metadata, the needed metadata may be found by only traversing the path data. Compared with the traditional solution in which it is necessary to traverse both the file data and the directory data, the metadata search efficiency is greatly improved, and the data recovery speed is improved.

If it is determined at block 1120 that the received information is related to the inode value, then the process proceeds to block 1150. At block 1150, file data associated with the file is obtained, such as the file data described previously in connection with FIG. 3. For example, if the received information indicates that metadata for a file with an Mode value 0x00001001 is needed, it is only necessary to traverse the file data such as the file tree. At block 1160, the metadata describing the data to be recovered is determined based on the file data. For example, based on the received information, metadata corresponding to the inode value in the information is found from the file data.

After the metadata is determined, at block 1170, the data to be recovered is obtained based on the metadata. For example, the data to be recovered is obtained from the backup memory based on the information about the storage location of the data in the metadata in the backup memory. At block 1180, the data backup system 102 may transmit the data to be recovered to the data storage device 104 to implement data recovery.

A data recovery method according to the present disclosure has been described so far. It is possible to, depending on the type of information received and by using the combination of path data and file data, find the needed metadata more quickly, thereby recovering the backup data more quickly and improving the performance of the storage system.

The present inventors conducted performance comparisons between the conventional solution and the solution of the embodiments of the present disclosure, as shown in Table 1 below. As may be seen from Table 1, the performance of browsing/searching for a large number of files is greatly improved, and the speed is increased by about 100 times.

TABLE 1

| Files Count | Conventional solution | The solution of the present disclosure | Performance improvement |
| --- | --- | --- | --- |
| 5000 | 48.43 s | 0.18 s | 245x |
| 10000 | 95.17 s | 0.94 s | 101x |
| 20000 | 126.51 s | 1.68 s | 75x |
| 40000 | 134.89 s | 3.20 s | 42x |

Figure 12:
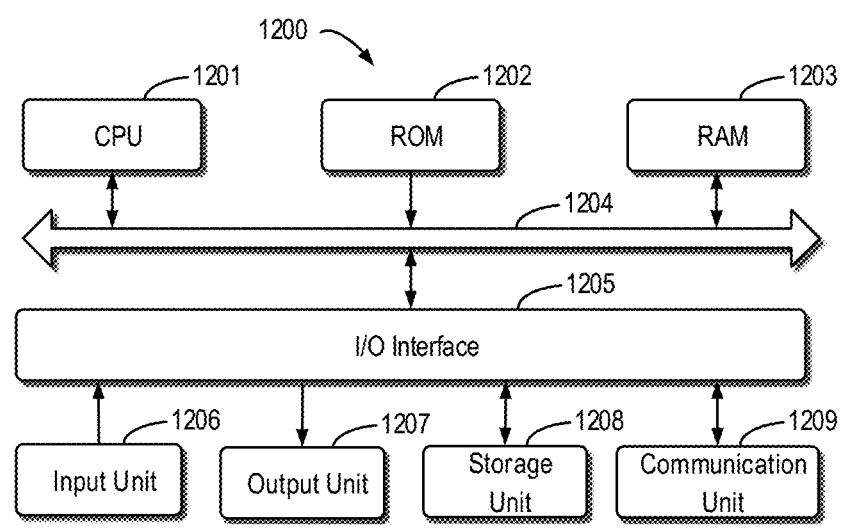
FIG. 12 illustrates a schematic block diagram of a device that may be used to implement embodiments of the present disclosure.

FIG. 12 shows a schematic block diagram of a device 1200 that may be used to implement embodiments of the present disclosure. The device 1200 may be used to implement the method stated with reference to FIG. 5, FIG. 6, and FIG. 11. As shown in FIG. 12, the device 1200 comprises a central processing unit (CPU) 1201 that may perform various appropriate actions and processing based on computer program instructions stored in a read-only memory (ROM) 1202 or computer program instructions loaded from a memory unit 1208 to a random access memory (RAM) 1203. In the RAM 1203, there further store various programs and data needed for operations of the device 1200. The CPU 1201, ROM 1202 and RAM 1203 are connected to each other via a bus 1204. An input/output (I/O) interface 1205 is also connected to the bus 1204.

Various components in the device 1200 are connected to the I/O interface 1205, including: an input unit 1206 such as a keyboard, a mouse and the like; an output unit 1207 including various kinds of displays and a loudspeaker, etc.; a memory unit 1208 including a magnetic disk, an optical disk, and etc.; a communication unit 1209 including a network card, a modem, and a wireless communication transceiver, etc. The communication unit 1209 allows the device 1200 to exchange information/data with other devices through a computer network such as the Internet and/or various kinds of telecommunications networks.

Various processes and processing described above, e.g., method 500, 600 and 1100, may be executed by the processing unit 1201. For example, in some embodiments, the method 500, 600 and 1100 may be implemented as a computer software program that is tangibly embodied on a machine readable medium, e.g., the storage unit 1208. In some embodiments, part or all of the computer program may be loaded and/or mounted onto the device 1200 via ROM 1202 and/or communication unit 1209. When the computer program is loaded to the RAM 1203 and executed by the CPU 1201, one or more steps of the method 500, 600 and 1100 as described above may be executed. Alternatively, in other embodiments, the CPU 1201 may be configured to perform methods 500, 600 and 1100 in any other suitable means (e.g., by means of firmware).

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

We claim:

1. A data backup method, comprising:
   receiving, by a data backup system, a data stream including data to be backed up and metadata describing the data to be backed up from a data storage device via Network Data Management Protocol (NDMP), the data to be backed up comprising a file and a directory, the metadata comprising file data associated with the file and directory data associated with the directory, wherein information obtained by a type indication information associated with the received data to be backed up is mapped to a corresponding tree as a first address of a root node of the corresponding tree, an inode value being mapped to a leaf node of the corresponding tree, wherein the inode value determines address of the leaf node of the corresponding tree, wherein the corresponding tree represents a file tree or a directory tree, wherein the file tree and the directory tree are separate trees;
   generating path data associated with both the file and the directory based on the file data and the directory data, wherein the path data represented as a path tree is mapped to the leaf node of the corresponding tree including the directory tree and the file tree; and
   storing the file data, the directory data, and the generated path data that are associated with the received data to be backed up.

2. The method according to claim 1, wherein generating the path data comprises:
   determining path information about the file and the directory from the file data and the directory data, wherein the path information about the file and the directory includes subdirectory or subfile information, parent directory information of the file and the directory; and
   generating the path data based on the path information.

3. The method according to claim 2, wherein the path information comprises an inode value and subdirectory and subfile information of the file and the directory, and
   wherein the generating the path data comprises:
      creating an index structure comprising nodes based on the subdirectory and subfile information, each of the nodes comprising the inode value;
      determining, from the file data and the directory data, metadata information corresponding to the inode value; and
      updating the nodes in the index structure based on the metadata information.

4. The method according to claim 3, further comprising:
   determining whether all sibling nodes of a node have been updated; and
   in response to all the sibling nodes having been updated, storing the node and all the sibling nodes.

5. The method according to claim 4, wherein determining whether the sibling nodes have been updated comprises:
   determining whether the sibling nodes include the metadata information; and in response to determining that the sibling nodes fail to include the metadata information, determining that the sibling nodes have not been updated.

6. The method according to claim 5, wherein determining whether the sibling nodes have been updated comprises:
in response to determining that the sibling nodes include the metadata information, determining whether the sibling nodes are associated with a file; and
in response to the sibling nodes being associated with the file, determining that the sibling nodes have been updated.

7. The method according to claim 6, wherein determining whether the sibling nodes have been updated comprises:
in response to the sibling nodes not being associated with the file, determining whether metadata of all child nodes of the sibling nodes have been stored;
in response to all the child nodes having been stored, determining that the sibling nodes have been updated; and
in response to not all of the child nodes having been stored, determining that the sibling nodes have not been updated.

8. The method according to claim 4, further comprising:
removing the node and all the sibling nodes from the index structure.

9. A data recovery method, comprising:
receiving information about data to be recovered;
in response to the information being related to a path, obtaining path data associated with both a file and a directory, the path data being generated based on file data associated with the file and directory data associated with the directory, wherein information obtained by a type indication information associated with the received data to be backed up is mapped to a corresponding tree as a first address of a root node of the corresponding tree, an inode value being mapped to a leaf node of the corresponding tree, wherein the inode value determines address of the leaf node of the corresponding tree, wherein the corresponding tree represents a file tree or a directory tree, wherein the file tree and the directory tree are separate trees;
determining, based on the path data, metadata describing the data to be recovered wherein the path data represented as a path tree is mapped to the leaf node of the corresponding tree including the directory tree and the file tree;
obtaining, based on the metadata, the data to be recovered; and
transmitting the data to be recovered to implement data recovery.

10. The method according to claim 9, further comprising:
obtaining the file data in response to the information being related to an inode value;
determining, based on the file data, the metadata describing the data to be recovered;
obtaining, based on the metadata, the data to be recovered; and
transmitting the data to be recovered to implement data recovery.

11. An electronic device, comprising:
at least one processor;
a memory coupled to the at least one processor and having instructions stored thereon, which when executed by the at least one processor, causing the at least one processor to perform operations, the operations comprising:

receiving, by a data backup system, a data stream including data to be backed up and metadata describing the data to be backed up from a data storage device via Network Data Management Protocol (NDMP), the data to be backed up comprising a file and a directory, the metadata comprising file data associated with the file and directory data associated with the directory, wherein information obtained by a type indication information associated with the received data to be backed up is mapped to a corresponding tree as a first address of a root node of the corresponding tree, an inode value being mapped to a leaf node of the corresponding tree, wherein the inode value determines address of the leaf node of the corresponding tree, wherein the corresponding tree represents a file tree or a directory tree, wherein the file tree and the directory tree are separate trees;
generating path data associated with both the file and the directory based on the file data and the directory data, wherein the path data represented as a path tree is mapped to the leaf node of the corresponding tree including the directory tree and the file tree; and
storing the file data, the directory data, and the generated path data that are associated with the data to be backed up.

12. The device according to claim 11, wherein the operations further comprise:
determining path information about the file and the directory from the file data and the directory data, wherein the path information about the file and the directory includes subdirectory or subfile information, parent directory information of the file and the directory; and
generating the path data based on the path information.

13. The device according to claim 12, wherein the path information comprises an inode value and subdirectory and subfile information of the file and the directory, and wherein the operations further comprise:
creating an index structure comprising nodes based on the subdirectory and subfile information, each of the nodes comprising the inode value;
determining, from the file data and the directory data, metadata information corresponding to the inode value; and
updating the nodes of the index structure based on the metadata information.

14. The device according to claim 13, wherein the operations further comprise:
determining whether all sibling nodes of a node have been updated; and
in response to all the sibling nodes having been updated, storing the node and all the sibling nodes.

15. The device according to claim 14, wherein the operations further comprise:
determining whether the sibling nodes include the metadata information; and
in response to determining that the sibling nodes fail to include the metadata information, determining that the sibling nodes have not been updated.

16. The device according to claim 15, wherein the operations further comprise:
in response to determining that the sibling nodes include the metadata information, determining whether the sibling nodes are associated with a file; and
in response to the sibling nodes being associated with the file, determining that the sibling nodes have been updated.

17. The device according to claim 16, wherein the operations further comprise:
- in response to the sibling nodes not being associated with the file, determining whether metadata of all child nodes of the sibling nodes have been stored;
- in response to all the child nodes having been stored, determining that the sibling nodes have been updated; and
- in response to not all the child nodes having been stored, determining that the sibling nodes have not been updated.

18. The device according to claim 14, wherein the operations further comprise:
- removing the node and all the sibling nodes from the index structure.

19. An electronic device, comprising:
- at least one processor;
- a memory coupled to the at least one processor and having instructions stored thereon, which when executed by the at least one processor, causing the at least one processor to perform operations, the operations comprising:
  - receiving information about data to be recovered, wherein information obtained by a type indication information associated with the received data to be backed up is mapped to a corresponding tree as a first address of a root node of the corresponding tree, an inode value being mapped to a leaf node of the corresponding tree, wherein the inode value determines address of the leaf node of the corresponding tree, wherein the corresponding tree represents a file tree or a directory tree, wherein the file tree and the directory tree are separate trees;
  - in response to the information being related to a path, obtaining path data associated with both a file and a directory, the path data being generated based on file data associated with the file and directory data associated with the directory, wherein the path data represented as a path tree is mapped to the leaf node of the corresponding tree including the directory tree and the file tree;
  - determining, based on the path data, metadata describing the data to be recovered;
  - obtaining, based on the metadata, the data to be recovered; and
  - transmitting the data to be recovered to implement data recovery.

20. The device according to claim 19, wherein the operations further comprise:
- obtaining the file data in response to the information being related to an inode value;
- determining, based on the file data, the metadata describing the data to be recovered;
- obtaining, based on the metadata, the data to be recovered; and
- transmitting the data to be recovered to implement data recovery.

* * * * *